United States Patent
Damrath et al.

(10) Patent No.: US 7,537,642 B2
(45) Date of Patent: May 26, 2009

(54) METHOD AND DEVICE FOR DISCHARGING AND DEHUMIDIFYING AIR IN A COOKING AREA

(75) Inventors: Joachim Damrath, Bachhagel (DE); Andreas Hauer, Koenigsdorf (DE); Martin Kornberger, Bielefeld (DE); Eberhard Laevemann, Groebenzell (DE)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 333 days.

(21) Appl. No.: 10/539,550

(22) PCT Filed: Dec. 4, 2003

(86) PCT No.: PCT/EP03/13722

§ 371 (c)(1), (2), (4) Date: Dec. 14, 2005

(87) PCT Pub. No.: WO2004/054689

PCT Pub. Date: Jul. 1, 2004

(65) Prior Publication Data

US 2006/0144226 A1 Jul. 6, 2006

(30) Foreign Application Priority Data

Dec. 18, 2002 (DE) .................. 102 59 345

(51) Int. Cl.
*B01D 53/26* (2006.01)
*F24C 15/20* (2006.01)

(52) U.S. Cl. ............... 95/91; 95/117; 96/118; 96/139; 96/141; 96/146; 96/154; 126/301; 55/DIG. 36

(58) Field of Classification Search .. 126/299 R–299 F; 96/118, 134, 135, 139, 141, 143, 144, 146, 96/154, 417; 95/91, 117, 268, 272; 55/525, 55/DIG. 36
See application file for complete search history.

(56) References Cited

U.S. PATENT DOCUMENTS

| 2,886,124 | A | * | 5/1959 | Scharmer | ............... 96/121 |
| 4,411,675 | A | * | 10/1983 | de Castella | ............... 96/140 |
| 5,649,428 | A | | 7/1997 | Calton et al. | |
| 2004/0107834 | A1 | | 6/2004 | Feisthammel et al. | |

FOREIGN PATENT DOCUMENTS

| DE | 31 29 848 | 2/1983 |
| DE | 37 39 145 | 5/1989 |
| DE | 299 03 794 | 5/1999 |
| DE | 100 20 205 | 11/2000 |
| EP | 1 106 948 | 6/2001 |
| EP | 1 111 311 | 6/2001 |
| GB | 2 110 107 | 6/1983 |
| JP | 2001-190925 | 7/2001 |

OTHER PUBLICATIONS

International Search Report for PCT/EP2003/013722 May 2004.
National Search Report EP 03 776 922.1-2113 dated Sep. 2008.

* cited by examiner

Primary Examiner—Frank M Lawrence
(74) Attorney, Agent, or Firm—James E. Howard

(57) ABSTRACT

A method and a device for discharging air current from a cooking area. The method and the device guide the air current through a sorption agent for absorbing water or water vapor contained in the air current. The sorption agent is regenerated preferably when the air current is not being discharged from the cooking area.

33 Claims, 4 Drawing Sheets

METHOD AND DEVICE FOR DISCHARGING AND DEHUMIDIFYING AIR IN A COOKING AREA

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of the Invention

Figure 1:
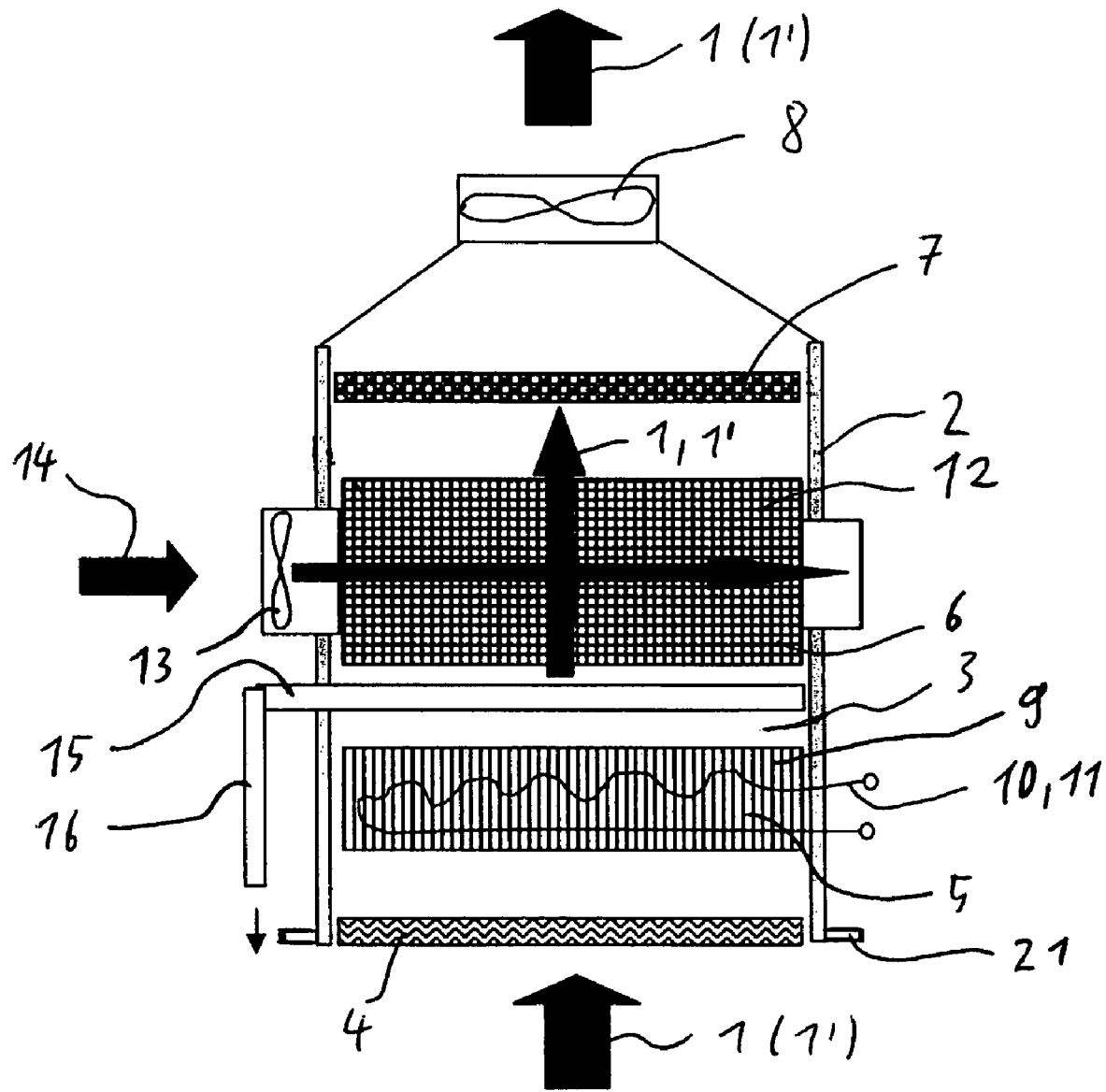

The present invention relates to a method for discharging vapor-laden air in a cooking area and a corresponding vapor-discharging device. In addition, this invention relates to a method for operating a vent device.

2. Description of Related Art

Numerous problems that occur in conjunction with treatment of air are known from the state of the art. For the user, such problems are noticeable most clearly and most directly in discharging cooking vapors and/or other kitchen odors, especially in a cooking area, so that this group of problems is of primary concern within the scope of the present invention. However, this is not to exclude other application fields with which those skilled in the art may be familiar, i.e., fields where the situation is similar or special cutting manufacturing machines in factories that are cooled with an oil-in-water emulsion.

In general the problem of having to remove the vapors and/or odors formed in cooking occurs in cooking areas. In addition to a very high water vapor content, these fumes also contain air from which fats and odoriferous substances may be precipitated, among other things. Various methods for discharging air from cooking areas and the corresponding household appliances are known from the state of the art to solve this problem. With household appliances, vent hoods may be differentiated according to two types of function that differ in general: exhaust hoods and circulating hoods. Exhaust hoods filter a large portion of the fat particles contained in cooking vapors out of the vapors and then discharge the air to the outdoors through a duct and a masonry box or similar devices. The effect of such exhaust hoods is good in principle, but installation is often problematical and very complex. Installation is not even possible in many homes, because there is no outside air connection, for example, or it cannot be implemented at a reasonable expense. In the long run, however, such vent hoods may also constrict or even block an exhaust duct such as a chimney due to cooking deposits or may even destroy them due to a buildup of soot.

Circulating hoods first carry the vented air through a fat filter and then through an activated carbon filter and then discharge the air thus conveyed back into a room, in particular back into the kitchen. The effect of such known circulating hoods is unsatisfactory, however, mainly for the following reasons. There is no removal of moisture, so the atmospheric humidity rises rapidly in the kitchen when cooking. Furthermore, elimination of odors by the activated carbon filter is satisfactory for only a short period of time because the activated carbon filter rapidly becomes clogged mainly by fine particles of fat and water molecules not retained by the fat filter. The activated carbon filter therefore becomes ineffective and must be replaced frequently.

A device then operates on a purely mechanical basis for reducing the fat content of air is known from German Utility Model DE 299 03 794 U1, wherein a mechanical separation grid for separating liquid and/or solid particles is proposed; this device is based essentially on the design of a stabilized labyrinth system for improved collection and discharging of fluids. However, the good effect described in DE 299 03 794 U1 is limited essentially to filtering out relatively large fluid and solid particles, but also it produces a loud flowing noise. Functioning is possible only in the so-called "fog range." However it is impossible to separate moisture from a mixture of air and water vapor using this device.

German Utility Model DE 299 23 124 U1 discloses a device that provides a heat exchanger in a crosscurrent or countercurrent operation with cooling air for condensing the water vapor content out of air. A labyrinth must always be provided upstream from this device to lengthen the respective cooling zone because of the relatively minor temperature difference between the air and the cooling air. With this device, in general the dew point of humid air cannot be reached in general. The water separation effect is inadequate. Furthermore, this approach results in high flowing noises on the one hand while on the other hand also resulting in a very complex internal structure involving problems in production and cleaning.

However, German Patent DE 100 20 205 A1 proposes an active cooling of the air in a vapor vent hood, performed by a heat exchanger (that is protected from icing up) with a regulated refrigeration machine. Providing adequate cooling power without icing up, in particular in a resting position, requires a refrigeration machine with relatively large dimensions in view of the large volumes of air to be handled in such a device. Therefore, this approach has the disadvantage of having a high electric power demand during operation of such a vapor vent hood in addition to its large size.

BRIEF SUMMARY OF THE INVENTION

The object of the present invention is to create a method for discharging vapor-laden air in cooking areas and a corresponding device having improved water separation as well as an improved efficiency.

This object is achieved according to this invention by a method having the features of claim 1 and claim 37 and a vapor vent device according to claim 18. Advantageous refinements of this invention are the object of the dependent claims.

An inventive method and an inventive device for discharging air from a cooking area are characterized in that the air flow is passed through a sorbent (desiccant) for absorbing water or water vapor in the airstream, and the sorbent is regenerated.

This makes it possible in a simple way to bind water, in particular water in gaseous form in the airstream (humid air) in relatively large quantities without having to provide a high cooling power, for example, to condense the water out of the airstream.

The water-saturated sorbent is preferably regenerated when the device is not in operation. This is the case at night in particular.

In an advantageous embodiment of this invention, fat and oil and water droplets present in the airstream are preferably removed with the help of a fat filter upstream from the sorbent.

In addition, in a preferred embodiment, odoriferous substances present in the airstream are separated by means of an odor filter situated preferably downstream from the fat filter and preferably downstream from the sorbent. It is especially advantageous when a sorbent that can absorb not only water but also odoriferous substances is used.

In an advantageous embodiment, the airstream which is discharged from a space above a cooking area, in particular a kitchen, is returned to the room after being dehumidified and after removal of other substances such as fat, oil and odoriferous substances, so the present method is suitable for a circulating hood in particular.

In an advantageous embodiment, the airstream is divided into a first and second air substream upstream from the sorbent. The first air substream is passed through the sorbent and the second air substream is passed around the sorbent. Downstream from the sorbent, the first and second air substreams are then combined and returned to the room. The airstream combined downstream from the sorbent can be adjusted to a moisture level corresponding to a moisture level without a cooking process by the fact that the volume flow ratio between the first air substream and the second air substream is adjustable by means of an airstream-dividing device which is preferably situated, this adjustment being performed by means of a valve designed as an air valve and situated downstream from the sorbent. Since the first air substream which is passed through the sorbent is almost completely dehumidified and the second air substream which is passed around the sorbent has an excessively high moisture content, the moisture level of the airstream on leaving the vapor venting device can therefore be adjusted as desired or as needed from drier than the ambient room air to more humid than the ambient room air by means of the airstream-dividing device.

Depending on which agent is used as the sorbent, the sorbent is heated up to a relatively great extent by sorption of water out of the air flowing through. Downstream from the sorbent, the combined airstream is cooled again to a reduced temperature, which is only slightly above room temperature, depending on the volume flow ratio of the two air substreams to one another, by passing the second air substream, which is at approximately room temperature, around the sorbent and combining it again with the first air substream which has passed through the sorbent and has thereby been heated greatly under some circumstances. In this way it is possible for the airstream leaving the vapor-discharging device during vapor discharge operation to have not only a suitable moisture content but also a suitable temperature.

In an advantageous embodiment, the water and/or water vapor in the airstream is sorbed, e.g., by means of $CaCl_2$ and/or LiCl and/or silica gel and/or zeolite and/or SWS (selective water sorbent). In an advantageous embodiment of this invention, the sorbent is regenerated by heating it to a temperature suitable for desorption of water from the respective sorbent used. Regeneration of the sorbent preferably takes place when no airstream laden with water vapor must be discharged from the cooking area, e.g., at night. For regeneration, a regeneration airstream through the sorbent is produced by the fan during the regeneration process. The regeneration airstream is many times smaller than the airstream in vapor discharging operation. Therefore, regeneration of the sorbent may be carried out as a very quiet process unnoticed by the user.

In an advantageous embodiment, the sorbent may be heated to the required desorption temperature directly by means of heating coils embedded in the sorbent or heated indirectly, preferably by microwave radiation directed at the water. In addition, the sorbent may also be heated to the required desorption temperature indirectly by a heated regenerating airstream, which is in turn heated by means of a heating device situated upstream from the sorbent. A heating coil may preferably be designed as an electric heating wire or as a fluid-carrying pipe which may be connected to the building heating system, for example.

In an advantageous embodiment, the regeneration airstream loaded with an increased moisture content can be returned to the room. This is not a problem because the regeneration process proceeds very slowly and therefore takes place over an extremely long period of time. Therefore the moisture is supplied to the room in a low dose per unit of time. In particular during the winter months when air is very dry due to the heating of rooms, the room air can be humidified slightly over an extensive period of time with the regeneration airstream and thereby brought to a pleasant atmospheric humidity level.

In a preferred embodiment, a condensation unit may be provided in the regeneration airstream downstream from the sorbent for condensing out the moisture in the regeneration airstream.

The condensation unit preferably has a heat exchanger which may be designed as a crosscurrent or countercurrent heat exchanger. The heat exchanger may be cooled with normal room air or with outside air or water, preferably from the building water system, or by means of a heat pump, preferably a refrigeration cycle or a Peltier element.

In a preferred embodiment, the regeneration airstream upstream from the sorbent is divided into a first regeneration air substream and a second regeneration air substream. The first regeneration air substream is either heated briefly and then passed through the sorbent or passed through the heated sorbent and the second regeneration air substream is passed around the sorbent and around a heater. Downstream from the sorbent, the first and second regeneration air substreams are combined again and returned back to the room. The first regeneration air substream after leaving the sorbent not only has an elevated moisture content but may also have a significantly elevated temperature in comparison with the temperature of the room air. By combining the first regeneration air substream with the second regeneration air substream downstream from the sorbent, a tolerable temperature on the whole and a somewhat reduced atmospheric humidity are achieved. By dividing the regeneration airstream into a first and a second regeneration air substream, it is possible to accomplish this type of regeneration with only one fan.

In an advantageous embodiment, regeneration airstream is divided into a first and a second regeneration air substream upstream from the sorbent. The first regeneration air substream is circulated through the sorbent and the second regeneration air substream is passed around the sorbent. Downstream from the sorbent, the first regeneration air substream is sent back to the entrance side of the sorbent through a condensation unit and through a connecting line. The second regeneration air substream is sent as a cooling airstream through the condensation unit and then is sent back into the room. In this way, the first regeneration air substream, which is passed through the sorbent, is circulated and the second regeneration air substream is used for cooling the condensation unit and following that is sent back into the room at an elevated temperature.

In another advantageous embodiment, the air substream which has been passed through the sorbent is not circulated but instead is mixed with the second airstream after being condensed out. In an advantageous embodiment, the water condensed in the condensation unit is collected in a trough or a pan and either discharged through a drain or collected in a collecting tank.

In an advantageous embodiment, the condensation unit includes a section of the outside wall of the housing, whereby the condensation unit is cooled by free convection of the room air on the outside of the outside wall and water is condensed out of the regeneration airstream on the inside of the outside wall.

In an advantageous embodiment of this invention, the condensation unit is provided with a second fan which conveys the ambient air for cooling the condensation unit through the condensation unit.

In an advantageous embodiment, the sorbent is arranged either in succession one after the other or in parallel as a bulk material in an air-permeable container, as a porous molded article or as an arrangement of multiple molded articles or bulk material containers in the direction of flow. Preferably several are arranged one after the other in the direction of flow in the form of plate-like flat bulk material containers or molded articles so that the flat bulk material containers or molded articles coming in contact with the airstream first in the direction of flow can be replaced easily because the sorbents coming in contact with the airstream first in the direction of flow may become contaminated by fats and oils which have not yet been removed by the upstream fat separator. In an advantageous embodiment, the sorbent is applied to a porous carrier material such as an open-pore sponge, a nonwoven material or a textile, whereby the carrier material is designed preferably with corrugations or in the form of a honeycomb to form a large surface area.

BRIEF DESCRIPTION OF THE SEVERAL VIEWS OF THE DRAWING(S)

Figure 2:
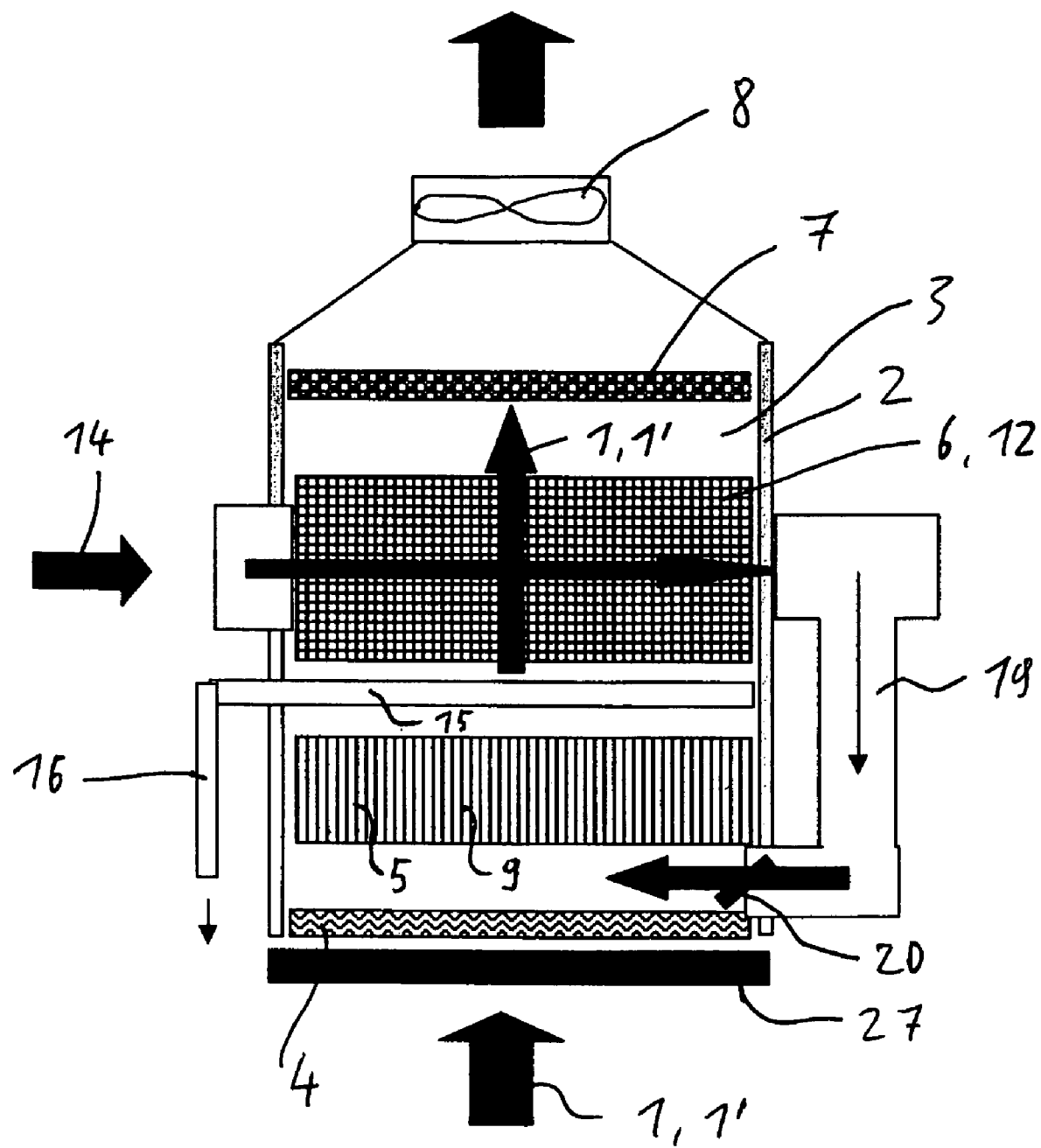
Figure 3:
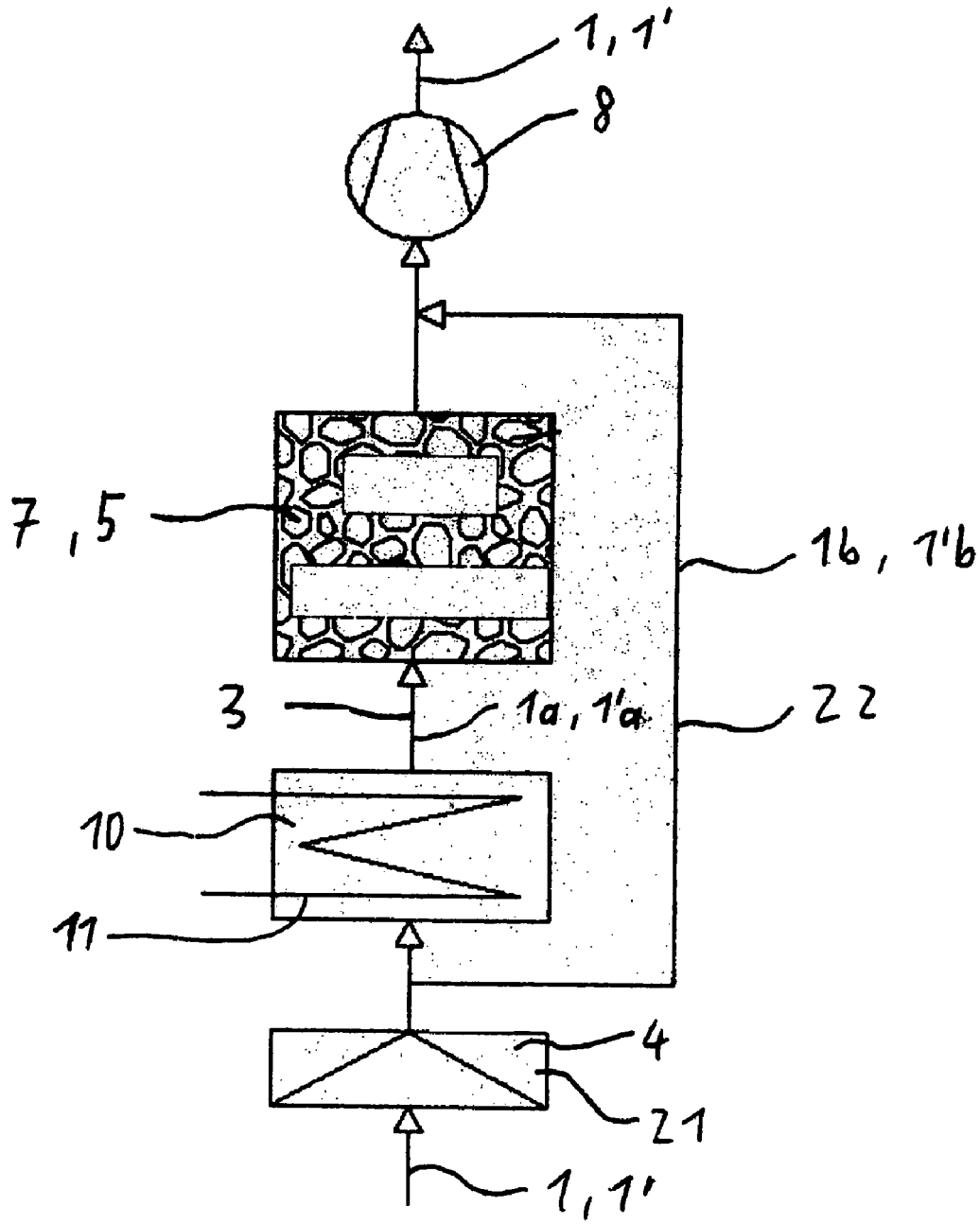
Figure 4:
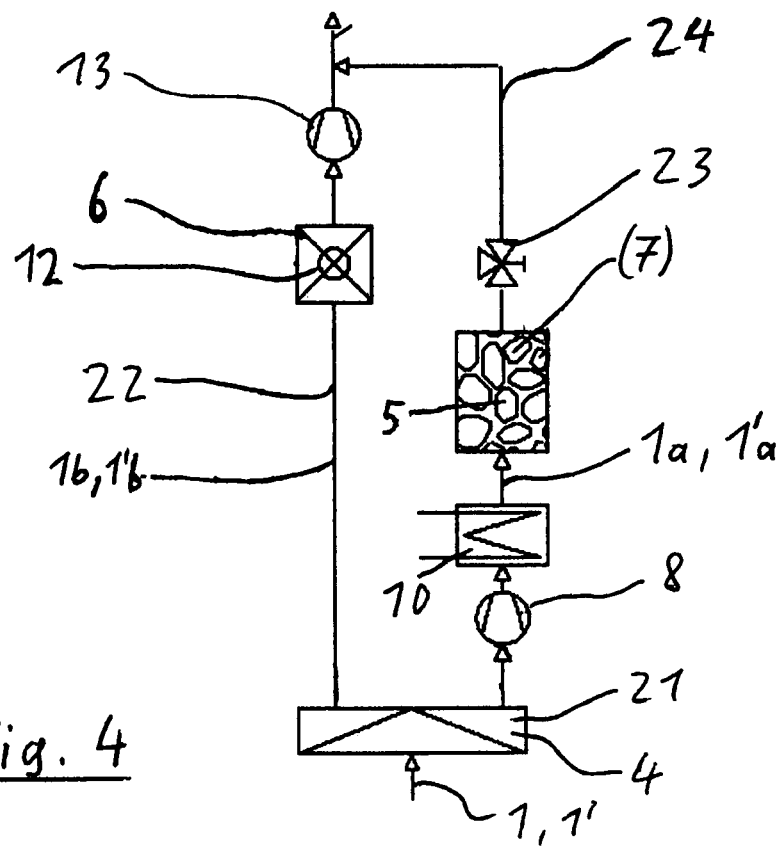
Figure 5:
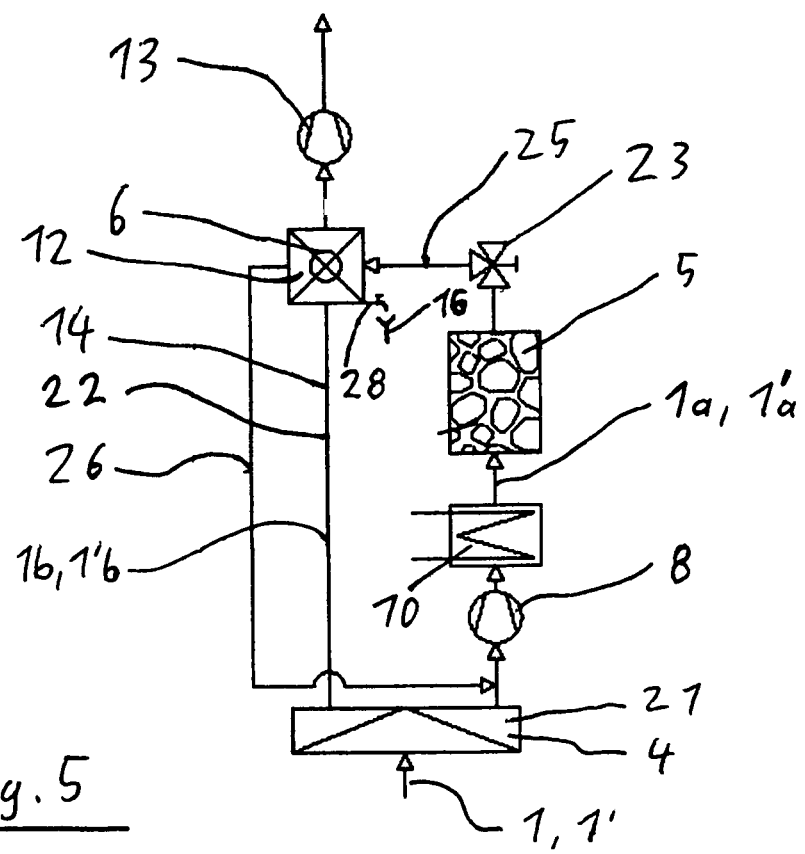

Some exemplary embodiments of this invention are illustrated in the drawings and explained in greater detail below. The drawings show:

FIG. 1 a schematic diagram through a vapor-discharging device according to a first exemplary embodiment;

FIG. 2 a schematic diagram of a vapor-discharging device according to a second exemplary embodiment;

FIG. 3 a schematic diagram of a vapor-discharging device according to a third exemplary embodiment;

FIG. 4 a schematic diagram of a vapor-discharging device according to a fourth exemplary embodiment, shown here in the suction-operating position;

FIG. 5 a schematic diagram of a vapor-discharging device according to FIG. 4 during the regeneration phase.

DETAILED DESCRIPTION OF THE INVENTION

FIG. 1 shows a vapor-discharging device which is preferably arranged above a cooking area (not shown) to remove an airstream 1 laden with cooking vapors and fumes. The vapor-discharging device has a housing 2 which has a main line 3 for the airstream 1. The vapor-discharging device according to FIG. 1 first has a fat filter 4 in the direction of flow of the airstream 1, then a sorbent 5, next a condensation unit 6, following that an odor filter 7 and then a fan 8. A screen or a hood 21 may also be provided to better guide the cooking vapors to the vapor-discharging device.

The fat filter 4 is preferably designed as an expanded metal filter or as an eddy current filter or as a labyrinth filter or even as a nonwoven filter. The fat filter 4 serves to remove fat, oil and water droplets present in the airstream out of the airstream 1.

In the present exemplary embodiment, $CaCl_2$ or LiCl or silica gel or a zeolite is used as the sorbent for adsorbing or absorbing water. The sorbent 5 is preferably applied to a honeycomb carrier material 9 or designed as a bulk material container. A heating device 10 is provided in the sorbent 5, preferably in the form of an electric heating coil. Downstream from the sorbent, a condensation unit 6 is provided, designed in the present case as a crosscurrent heat exchanger. An additional second fan 13 is provided for cooling the crosscurrent heat exchanger, creating a cooling airstream 14 through the crosscurrent heat exchanger. Further downstream from the condensation unit 6, the odor filter 7 is provided, the latter being designed preferably as an activated carbon filter. Beneath the condensation unit 6, a channel 15 is provided, collecting water of condensation from the condensation unit 6 and discharging it through a drain 16. The drain 16 may be connected to a siphon (not shown) or a collecting tank (not shown).

The vapor-discharging device depicted in FIG. 1 has essentially two modes of operation, a normal mode for discharging and cleaning air above a cooking area and a regeneration mode for regenerating the sorbent 5. In the normal mode, the fan 8 is operated at a high air volume output and vapors above the cooking area are removed with suction through the fat filter 4, the sorbent 5 and the odor filter 7 and then sent back into the room in which the cooking area is located. In this mode, first fat, oil and condensate are removed in the fat filter 4 and then the air in the sorbent is dried and following that, any odoriferous substances still remaining are removed from the dried air that has been freed of fat and condensate by means of the odor filter 7. For sorption of water, the sorbent 5 must be dehumidified in advance and/or desorbed.

In the present case, preferably so-called chemisorption in which the water molecule from the gas phase is bound to a solid phase boundary and stored chemically by hydration. Suitable materials for sorbent 5 include in particular $CaCl_2$ or LiCl. LiCl is especially advantageous because its dew point is as low as minus (−) 30° C. and a water uptake capacity of up to 4:1 is possible, i.e., 1 kg LiCl can bind 4 L of water. In the normal mode for generating an airstream 1, the heated unit 10 and normally also the condensation unit 6 are not in operation.

The regeneration mode is initiated when the vapor-discharging device is not being used in the normal mode, i.e., for suction removal of vapors. This is the case in particular when no cooking is being done, e.g., at night. It is then possible to preprogram by means of a control unit (not shown here) at what times regeneration operation is to be begun, if necessary.

In regeneration operation, the fan 8 is operated in a very low stage to convey only a small quantity of air and/or a regeneration airstream 1' through the vapor-discharging device. The heating device 10 in the form of the electric heating coil 11 is operated so that the sorbent 5 is heated to a so-called desorption temperature. The desorption temperature depends on the particular sorbent used. The regeneration airstream 1' entrains the desorbed water out of the sorbent 5. When the regeneration airstream 1' passes through the condensation unit 6 downstream from the sorbent 5, most of the water in the regeneration airstream 1' is condensed out and flows through the channel 15 and out through the drain 16.

Regeneration operation may preferably be continued for a long period of time, e.g., for five to eight hours.

The vapor-discharging device according to FIG. 1 may also be provided even without the condensation unit 6 in regeneration operation of the sorbent 5 or it may be operated with the condensation unit 6 turned off, if regeneration operation is to be used as an air humidifier.

In the exemplary embodiments described below according to FIGS. 2 through 5, only the differences and additions in comparison with the exemplary embodiment according to FIG. 1 will be described.

The vapor-discharging device depicted in FIG. 2 has a heat pump (not shown) for regeneration operation of the sorbent, e.g., according to the refrigeration system technology or Peltier technology, using the cold side of the heat pump to cool the condensation unit 6 and the hot side of the heat pump to heat the sorbent 5. An additional heating system 10 may be omitted if the heating capacity of the hot side of the heat pump is sufficient for desorption of the sorbent 5. When using a Peltier element as the heat pump, the heat generated on the hot side of the Peltier element is supplied via the cooling airstream 14 to the sorbent 5 via a connecting line 19 and a valve device 20 designed in the form of a valve upstream from the sorbent 5. If the vapor-discharging device is designed as a so-called flat screen hood with a screen slide 27, then the valve device 20 which is designed in the form of a valve can be opened by pushing in the screen slide or when the screen slide has been pushed in so that the control unit of the vapor-discharging device receives a readiness signal for the start of regeneration operation on insertion of the screen slide. In the cooking phase, the screen slide is opened and the main intake path is released while the valve 20 is closed. This system may also be used as a room air dehumidifier in the kitchen if the heat pump (not shown) remains turned off and if the sorbent 5 has already been pre-dried.

FIG. 3 shows another advantageous embodiment of the vapor-discharging device. The differences in comparison with the vapor-discharging device shown in FIGS. 1 and 2 is that zeolite is preferred as the sorbent and the heating device 10 is situated upstream in the airstream 1 and/or the regeneration airstream 1' as a separate heating device. Further upstream from the heating device 10 is the hood 21 which holds the fat filter 4. Downstream from the fat filter 4, a bypass line 22 branches off from the airstream 1, so that the airstream 1 is divided by means of an airstream-dividing device into a first air substream 1a and a second air substream 1b. The first air substream 1a is passed through the sorbent 5. The second air substream 1b is sent around the sorbent 5 through the bypass line 22. Downstream from the sorbent 5 the first air substream 1a and the second air substream 1b are combined again. The volume flow ratio between the first air substream 1a and the second air substream 1b preferably amounts to 3:1, for example, i.e., three parts by volume of the airstream 1 are passed through the bypass line 22 and one part by volume is sent through the sorbent 5.

The airstream-dividing device is preferably designed so that the flow resistances between the air bypass line 22 and the sorbent 5 are adjusted so that the desired division into a first air substream 1a and a second air substream 1b is achieved. Alternatively to this, adjustable valves or valves may also be provided in the bypass line or in the main line 3 which passes through the sorbent 5.

The air substream 1b that is passed through the sorbent is almost completely dehydrated when using zeolite as the sorbent 5. The zeolite heats up greatly when it absorbs water. This heat of reaction of the zeolite is dissipated through the second air substream 1b. The first air substream 1a thus leaves the sorbent 5 almost completely dehumidified but it is relatively hot. In order to nevertheless return an airstream 1 back to the room at a tolerable temperature and with an atmospheric humidity that preferably corresponds to the normal ambient atmospheric humidity, the second air substream 1b is combined with the first air substream 1a, which has passed only through the fat filter 4 and has an elevated atmospheric humidity level but a lower temperature than the air substream 1a and then the combined substreams are sent back into the room.

Regeneration operation in the embodiment of the vapor-discharging device according to FIG. 3 is described below. The regeneration airstream 1' produced by the fan 8 is many times smaller than that in vapor suction operation. The regeneration airstream 1' is divided at the branch in the bypass line 22 into a first regeneration air substream 1'a, which is sent through the heating device 10 and the sorbent 5, designed in the present case as a zeolite, and a second regeneration air substream 1'b which flows through the bypass line 22. Downstream from the sorbent 5, the two regeneration air substreams 1'a and 1'b are combined again and returned to the room through the fan 8. Since the regeneration temperature for zeolite as the sorbent 5 is relatively (approximately 250° C.), the first regeneration air substream 1'a sent through the sorbent 5 leaves the sorbent 5 toward the end of the process at a relatively high temperature and with an elevated moisture content. After combining the first regeneration air substream 1'a with the second regeneration air substream 1'b, which is sent through the bypass line 22, tolerable temperatures and a reduced humidity level on the whole are again achieved in the overall airstream. The dividing ratio between the first regeneration air substream 1'a and the second regeneration air substream 1'b corresponds to the same ratio as in suction operation, namely preferably 1/4 to 3/4 between the first regeneration air substream 1'a and the second regeneration air substream 1'b.

According to FIGS. 4 and 5, another embodiment of the vapor-discharging device is shown. This embodiment is a modification of the vapor-discharging device according to FIG. 3 where preferably zeolite is again used as the sorbent 5. The vapor-discharging device according to FIG. 4 in contrast with the vapor-discharging device according to FIG. 3 has a condensation unit 6 in the bypass line 22 and it has the fan 8 downstream from the condensation unit. Upstream from the heating device 10, the additional second fan 13 is provided in the regeneration airstream 1', but this fan may also be provided downstream from the sorbent 5.

A 3/2-way valve 23 is provided downstream from the sorbent 5. According to FIG. 4, in the first position of the 3/2-way valve 23, the air substream 1a is combined with the bypass line 22 through a connecting line 24 downstream from the condensation unit 6, preferably downstream from the fan 8. In this first position of the 3/2-way valve, the vapor-discharging device is in vapor-discharging operation, where a large quantity of air above a cooking area is vented, cleaned and dehydrated and then sent back into the room.

In a second position of the 3/2-way valve 23 (according to FIG. 5) the main line 3 is connected to the condensation unit 6 by a connecting line 25. The condensation unit 6 is in turn connected to the main line 3 by a return line 26 upstream from the sorbent 5. The condensation unit 6 is provided with a drain valve 28 and a drain 16. According to FIG. 5, the vapor-discharging device is shown in regeneration operation in which only a small stream of air is carried in circulation through the main line 3 via the heating device 10, the sorbent 5, the 3/2-way valve 23, the condensation unit 6, the return line 26, and ambient air is supplied for cooling the condensation unit 6 via the bypass line 22.

According to FIG. 4, the airstream 1 is divided into the first air substream 1a and the second air substream 1b based on the preselectable ratio of the delivery quantities of the fan 8 and the fan 13.

The features of the embodiments of the vapor-discharging devices described above with their modifications can be combined freely with one another. For example, the embodiments according to FIGS. 1 and 2 may also be provided with the bypass line 22 as in the embodiments according to FIGS. 3 through 5. The embodiments according to FIGS. 1 and 2 may also be operated with a zeolite as the sorbent.

The invention claimed is:

1. A method for discharging an airstream from a cooking area, comprising the steps of:
dividing said airstream into a first air substream and a second air substream upstream from a sorbent and
passing said first air substream through said sorbent,
bypassing said second air substream around said sorbent and combining said first air substream and said second air substream downstream from said sorbent and sending said combined first air substream and said second air substream back into a room, wherein the airstream is passed through said sorbent for sorption of water or water vapor present in said airstream using an air discharge device having a fan operational to pass the airstream in a first flow mode at a first predetermined flow rate
discharging said airstream from said room and returning at least a portion of said airstream back to said room downstream from said sorbent; and
regenerating said sorbent when said air discharge device fan is operational to pass the airstream at a second predetermined flow rate, said second predetermined flow rate being less than said first predetermined flow rate, thereby defining a second flow mode for sorbent regeneration.

2. The method according to claim 1, including sorption of said water or said water vapor by at least one of $CaCl_2$, LiCl, silica gel or zeolite.

3. The method according to claim 1, including regenerating of said sorbent by desorption of said sorbent by heating said sorbent to a temperature suitable for desorption of said water from said sorbent.

4. The method according to claim 3, including regenerating of said sorbent when it is not necessary to discharge an airstream above the cooking area.

5. The method according to claim 3, including producing a regeneration airstream through said sorbent during said regeneration process and forming said regeneration airstream smaller than said airstream in the cooking process.

6. The method according to claim 3, including heating said sorbent directly by providing at least one of a heating device embedded in said sorbent in the form of heating coils, indirectly by providing microwave radiation adjusted for said water or by heating indirectly by heating said regeneration airstream upstream from said sorbent.

7. The method according to claim 5, including returning said regeneration airstream to said room in order to humidify said room at least in the winter.

8. The method according to claim 5, including condensation of the moisture content in said regeneration airstream by providing and utilizing a condensation unit.

9. The method according to claim 8, including cooling said condensation unit by at least one of room air, outside air, water, water from the building water system, by providing and utilizing a heat pump, by providing and utilizing a heat pump refrigeration system or a Peltier element.

10. The method according to claim 5, including dividing said regeneration airstream upstream from said sorbent into a first regeneration air substream and a second regeneration air substream,
passing said first regeneration air substream through said sorbent,
bypassing said second regeneration air substream around said sorbent,
combining said first regeneration air substream and said second regeneration air substream downstream from said sorbent and returning said combined regeneration airstream back to the cooking area.

11. The method according to claim 8, including dividing said regeneration airstream into a first regeneration air substream and a second regeneration air substream upstream from said sorbent,
passing said first regeneration air substream through said sorbent,
passing said second regeneration air substream around said sorbent,
returning said first regeneration air substream to the inlet side of said sorbent,
sending said second regeneration air substream as a cooling airstream through said condensation unit and returning said second regeneration air substream to a room downstream from said condensation unit.

12. The method according to claim 8, including discharging said condensed water into a drain or a storage container.

13. A vapor-discharging device for discharging an air stream from a cooking area, comprising:
a housing;
a fan for conveying the airstream through the vapor-discharging device, said fan being operational to pass the airstream in a first flow mode at a first predetermined flow rate;
a sorbent arranged in said airstream for sorption of water or water vapor in said airstream;
a bypass for bypassing at least one of an air substream or a partial regeneration airstream around said sorbent in a bypass line and an air-dividing device to adjust the volume flow ratio between said airstream in said bypass line and said airstream in a main line; and
means for regenerating said sorbent operational when said air discharge device fan is operational to pass the airstream at a second predetermined flow,rate said second predetermined flow rate being less than said first predetermined flow rate, thereby defining a second flow mode for sorbent regeneration.

14. The device according to claim 13, including at least one of an expanded metal fat filter, a nonwoven filter or an eddy current filter provided for separation of fat, oil and water of condensation from said airstream upstream from said sorbent.

15. The device according to claim 13, including an activated carbon ordor filter provided downstream from said fat filter for separation of odors from said airstream.

16. The device according to claim 13, including said fan creates a regeneration airstream through said sorbent and said regeneration airstream being smaller than heat exchanger airstream.

17. The device according to claim 13, including said sorbent provided in at least one of the form of a bulk material in an air-permeable bulk material container, designed as a porous molded article, the form of a plurality of plate-like porous molded articles or a plurality of plate-like flat bulk material containers which are arranged one after the other in the direction of flow or in parallel.

18. The device according to claim 13, including said sorbent is adhered to at least one of a porous carrier material such as an open-pore sponge, a tile material, a corrugated textile or a honeycomb textile structure to provide a large surface area.

19. The device according to claim 13, including multiple carrier materials provided with sorbent arranged one after the other in the direction of flow or in parallel with said airstream.

20. The device according to claim 13, including said sorbent is formed by at least one of CaCl2, LiCl, silica gel, zeolite or SWS (selective water sorbent).

21. The device according to claim 13, including said airdividing device formed by a throttle valve arranged in said main line downstream from said sorbent.

22. The device according to claim 13, including said vapor-discharging device is used as one of a room air humidifier or a room air dryer.

23. The device according to claim 13, including said vapor-discharging device including an extractable shield, the extracted position used as a signal for the exhaust operation and the retracted position used as a signal for the regeneration operation.

24. A method for discharging an airstream from a cooking area, comprising the steps of:
dividing said airstream into a first air substream and a second air substream upstream from a sorbent and passing said first air substream through said sorbent, bypassing said second air substream around said sorbent and combining said first air substream and said second air substream downstream from said sorbent and sending said combined first air substream and said second air substream back into a room, wherein the airstream passes through said sorbent for sorption of water or water vapor present in said airstream using an air discharge device having a fan operational to pass the airstream in a first flow mode at a first predetermined flow rate;
separating fat and oil present in said airstream upstream from said sorbent by providing and utilizing a fat filter; and
regenerating said sorbent when said air discharge device fan is operational to pass the airstream at a second predetermined flow rate, said second predetermined flow rate being less than said first predetermined flow rate, thereby defining a second flow mode for sorbent regeneration.

25. The method according to claim 24, including separating odoriferous substances present in said airstream by providing and utilizing by at least one of an odor filter downstream from said fat filter or when using a sorbent that can also separate odors by utilizing said sorbent.

26. The method according to claim 25, including adjusting the residual moisture content of said combined airstream by adjusting the volume flow ratio between said first air substream and said second air substream, preferably to a ratio such that said combined airstream has a moisture level corresponding to the moisture level in the absence of a cooking process. separation of odors from said airstream.

27. A vapor-discharging device for discharging an air stream from a cooking area, comprising:
a housing;
a fan for conveying the airstream through the vapor-discharging device, said fan being operational to pass the airstream in a first flow mode at a first predetermined flow rate;
a condensation unit having a cooling device, said cooling device having a second fan for cooling said condensation unit by utilizing ambient air;
a sorbent arranged in said airstream for sorption of water or water vapor in said airstream; and
means for regenerating said sorbent for desorption of said water out of said sorbent, said means for regeneration being operational when said air discharge device fan is operational to pass the airstream at a second predetermined flow rate, said second predetermined flow rate being less than said first predetermined flow rate, thereby defining a second flow mode for sorbent regeneration and wherein said regeneration device has at least one of a heat exchanger condensation unit or a capacitor according to the crosscurrent or countercurrent technology arranged downstream from said sorbent.

28. The device according to claim 27, including said means for regenerating has a heating device for one of direct heating of said sorbent utilizing at least one of a heating device arranged in said sorbent or a microwave heating device arranged around said sorbent or indirect heating of said sorbent by heating a regeneration airstream passed through said sorbent upstream from said sorbent.

29. The device according to claim 27, including said condensation unit includes an outside wall of said housing, said outside wall being cooled by free convection of the room air on the outside of said outside wall and water being condensed on the inside of said outside wall.

30. The device according to claim 27, including said cooling device has at least one of a refrigeration cycle or a Peltier element and an air guidance device provided between the hot side of said refrigeration cycle or said Peltier element and said sorbent in order to use one of air heated by said hot side of said refrigeration cycle or said Peltier element for heating said sorbent in the regeneration process.

31. The device according to a claim 29, including a condensate-collecting device in the form of one of a trough or a pan which is connected to one of a drain or collecting container provided on said condensation unit.

32. The device according to claim 27, including said heat exchanger is arranged in said bypass line, and a valve device is provided downstream from said sorbent in said main line, establishing a connection to said bypass line downstream from said heat exchanger in a first position and having a second position sending said regeneration airstream to said heat exchanger.

33. The device according to claim 32, including a connecting line provided from said heat exchanger to said main line upstream from said heating device for further conveyance of said regeneration airstream.

* * * * *